United States Defensive Publication [19] (H) [11] T105,602

Mair [43] Jul. 2, 1985

[54] THERMAL TREATMENT OF PHOSPHATE ROCK

[76] Inventor: Alexander D. Mair, Rte. 7, Box 143, Florence, Ala. 35630

[21] Appl. No.: 648,412

[22] Filed: Sep. 10, 1984

[51] Int. Cl.[3] ..... C01B 25/16

[52] U.S. Cl. ..... 423/167

[57] ABSTRACT

Phosphate rock is heated in two stages under controlled conditions to yield an improved calcined product rendered more suitable for subsequent acidulation by wet-process phosphoric acid. The two-stage thermal treatment of the instant invention is especially beneficial when applied to an apatitic phosphate rock possessing a high content of organic matter and a high degree of carbonate substitution in the apatite crystal lattice. By using heating conditions milder than those proposed by prior-art teachings, the instant process requires less externally supplied energy than such prior art calcination processes and yet yields calcined products of at least, and in most cases, greater than equivalent quality. For phosphate rock from the Pungo River Formation of North Carolina, a first-stage heating temperature in the range of 350° C. to 400° C. was particularly beneficial in providing acceptably low levels of both sulfide and residual organic matter and acceptably high levels of both surface area and reactivity to acid in the final calcined product.

9 Claims, No Sheets Drawing,

17 Pages Specification

The file of this unexamined application may be inspected and copies thereof may be purchased (849 O.G. 1221, Apr. 9, 1968).